United States Patent [19]

Miyawaki

[11] Patent Number: 5,012,696
[45] Date of Patent: May 7, 1991

[54] LINE PRESSURE CONTROL SYSTEM FOR A CONTINUOUSLY VARIABLE TRANSMISSION

[75] Inventor: Motohisa Miyawaki, Kawasaki, Japan

[73] Assignee: Fuji Jukogyo Kabushiki Kaisha, Tokyo, Japan

[21] Appl. No.: 423,037

[22] Filed: Oct. 18, 1989

[30] Foreign Application Priority Data

Oct. 19, 1988 [JP] Japan .................. 63-263356

[51] Int. Cl.$^5$ ............................................. B60K 41/18
[52] U.S. Cl. ......................................... 74/866; 74/867
[58] Field of Search ............... 74/866, 867; 364/424.1, 364/426.03

[56] References Cited

U.S. PATENT DOCUMENTS

| | | | |
|---|---|---|---|
| 4,507,986 | 4/1985 | Okamura et al. | 74/866 |
| 4,606,446 | 8/1986 | Watanabe | 192/0.076 |
| 4,610,183 | 9/1986 | Nobumoto et al. | 74/866 |
| 4,637,279 | 1/1987 | Itoh et al. | 74/866 |
| 4,653,005 | 2/1987 | Osanai et al. | 74/866 |
| 4,656,587 | 4/1987 | Osanai et al. | 74/866 |
| 4,760,893 | 8/1988 | Sigl et al. | 364/426.03 |
| 4,817,470 | 4/1989 | Müller et al. | 74/866 |
| 4,836,055 | 6/1989 | Suzuki | 74/866 |
| 4,843,552 | 6/1989 | Inagaki | 364/426.03 |
| 4,858,497 | 8/1989 | Kuono | 364/424.1 |
| 4,873,639 | 10/1989 | Sato et al. | 364/426.03 |
| 4,884,653 | 12/1989 | Kuono | 364/424.1 |
| 4,886,123 | 12/1989 | Arnold et al. | 364/426.03 |
| 4,926,716 | 5/1990 | Hirano et al. | 74/866 |

FOREIGN PATENT DOCUMENTS 54-157930 12/1979 Japan .

Primary Examiner—Allan D. Herrmann
Assistant Examiner—Ryan Massey
Attorney, Agent, or Firm—Martin A. Farber

[57] ABSTRACT

A control system for a continuously variable transmission having a drive pulley with a hydraulically shiftable disc and a hydraulic cylinder for operating the disc, a driven pulley with a hydraulically shiftable disc and a hydraulic cylinder, and a pressure regulator valve for regulating pressure of oil supplied to the hydraulic cylinders. The pressure regulator valve has a pressure level changing port to increase the pressure of oil supplied to the cylinders. A solenoid operated valve is provided for supplying the oil to the pressure level changing port or for draining the port. When wheels of a vehicle spin, the solenoid operated valve is energized to supply the oil to the port, thereby increasing the pressure of the oil.

3 Claims, 8 Drawing Sheets

LINE PRESSURE CONTROL SYSTEM FOR A CONTINUOUSLY VARIABLE TRANSMISSION

BACKGROUND OF THE INVENTION

The present invention relates to a control system for a continuously variable belt-drive automatic transmission for a motor vehicle, and more particularly to a system for preventing a belt from slipping on pulleys of the belt drive transmission.

A known control system for a continuously variable belt-drive transmission connected to an electromagnetic clutch disclosed in Japanese Patent Application Laid-Open No. 54-157930 comprises an endless belt running over a drive pulley and a driven pulley. Each pulley comprises a movable conical disc which is axially moved by a fluid operated servo device so as to vary the running diameter of a belt on the pulleys in dependency on driving conditions. The system is provided with a hydraulic circuit including a pump for supplying oil to the servo devices, a line pressure control valve and a transmission ratio control valve. Each valve comprises a spool to control the oil supplied to the servo devices.

The transmission ratio control valve operates to decide the transmission ratio in accordance with the opening degree of a throttle valve of an engine and the speed of the engine.

The line pressure control valve is operatively connected with a sensor shoe through a lever and a spring. The sensor shoe is shifted in accordance with the transmission ratio, thereby changing the elastic force of the spring. Thus, the line pressure control valve is adapted to control the line pressure in accordance with the transmission ratio and the engine speed, that is, pitot pressure. The line pressure is controlled to prevent the belt from slipping on the pulleys in order to transmit the output of the engine.

At starting of the vehicle, the transmission ratio is set at a maximum value. When the engine speed exceeds a predetermined value, the electromagnetic clutch is engaged, so that the vehicle is started. When the vehicle speed and engine speed exceed set values under a driving condition, the transmission ratio starts to change (to upshift). The transmission ratio is automatically and continuously reduced, even if the engine speed is kept constant. Thus, the vehicle speed increases with the reduction of the transmission ratio.

However, the line pressure is controlled in accordance with the transmission ratio and the engine speed, and not dependent on changes of other driving conditions.

For example, when an accelerator pedal of the vehicle is rapidly depressed during driving on a road having a low friction coefficient, wheels of the vehicle may spin. If wheels spin, although the engine speed Ne and hence the wheel speed Vw increase, the vehicle body speed Vm hardly increases as shown in FIG. 6a. The increase of the engine speed Ne causes the pitot pressure to rise so that the transmission ratio i reduces (upshift), thereby decreasing line pressure $P_L$ (FIG. 6b). When the driver, noticing the spinning of the wheels, releases the accelerator pedal (FIG. 6c), the engine speed Ne and the wheel speed Vw rapidly decrease. As a result, the wheels come into gripping of the road. The transmission is upshifted to a minimum small transmission ratio because of the reduction of the engine speed Ne. Accordingly, the line pressure $P_L$ becomes a minimum, so that the belt gripping force of the pulleys reduces. On the other hand, the speed of the driven pulley rapidly reduces because of the road gripping of the wheels. Such a sudden change in the rotational speed of the pulleys causes the belt to slip on the pulleys.

SUMMARY OF THE INVENTION

The object of the present invention is to provide a transmission ratio control system wherein the slipping of a belt on a drive pulley of a continuously variable transmission may be prevented.

The system of the present invention is characterized in that the line pressure is increased when wheels of a vehicle spin, thereby preventing the belt from slipping.

According to the present invention, there is provided a line pressure control system for a continuously variable transmission for transmitting the power of an automotive engine to wheels of a motor vehicle having an accelerator pedal, the system having a drive pulley with a hydraulically shiftable disc and a hydraulic cylinder for operating the disc, a driven pulley having a hydraulically shiftable disc and a hydraulic cylinder for operating the disc, a belt engaged with both pulleys and a hydraulic circuit having a pressure regulator valve for regulating the line pressure in the circuit.

The system comprises a wheel speed sensing means for sensing speed of the wheels, an accelerator pedal switching means for detecting the depression of the accelerator pedal, wheel spin detector means responsive to signals of the wheel speed sensing means and the accelerator pedal switching means for producing a wheel spin signal when the acceleration of the wheel speed is higher than a predetermined value, means responsive to the wheel spin signal for producing a changing signal to change the line pressure, and a line pressure level changing device provided in the hydraulic circuit for changing the line pressure from a low level to a high level in response to the changing signal.

The other objects and features of this invention will become understood from the following description with reference to the accompanying drawings.

DETAILED DESCRIPTION OF THE PREFERRED EMBODIMENTS

Figure 1A:
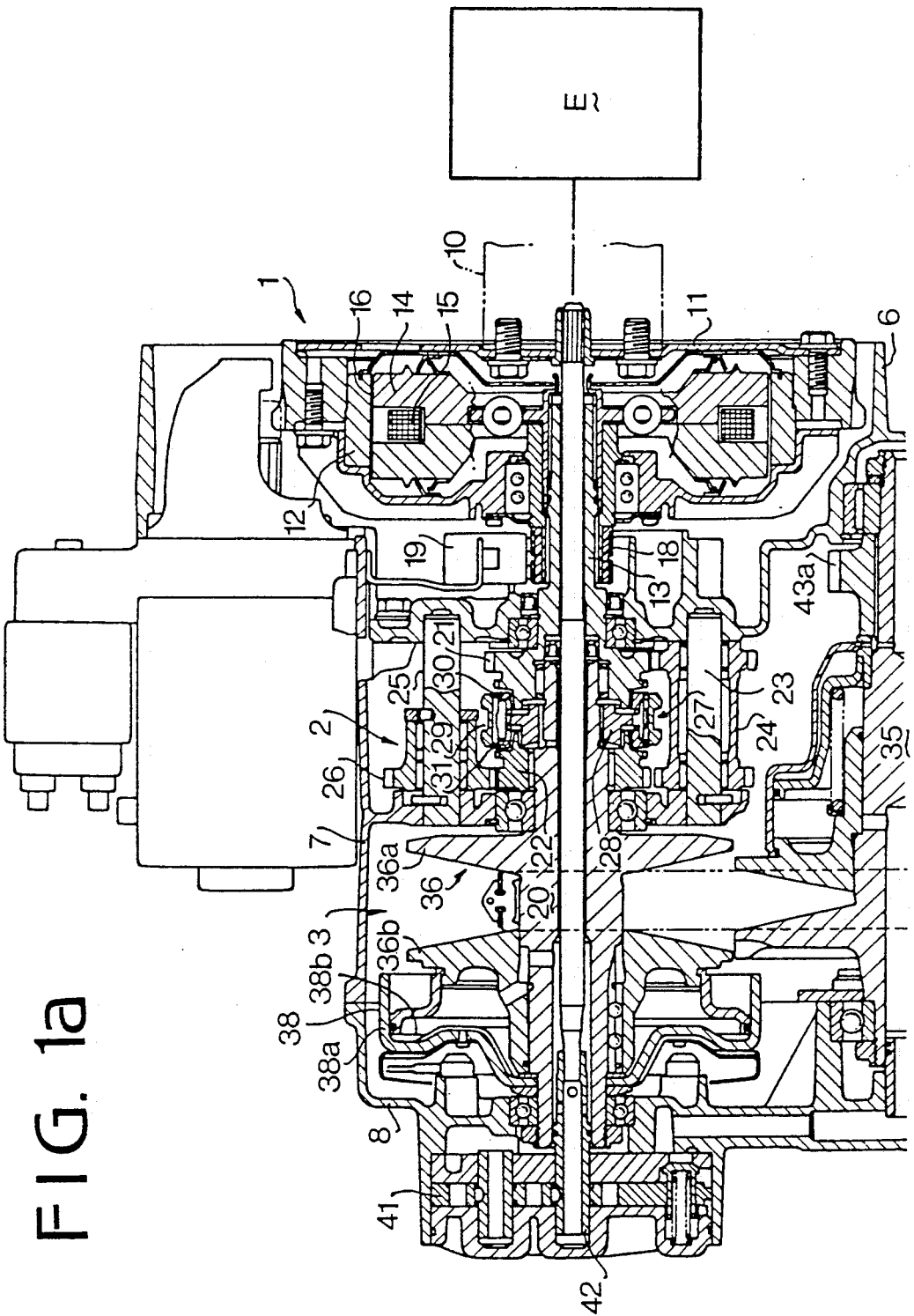
FIGS. 1a and 1b show a sectional view of a continuously variable belt-drive transmission to which the present invention is applied.
Figure 1B:
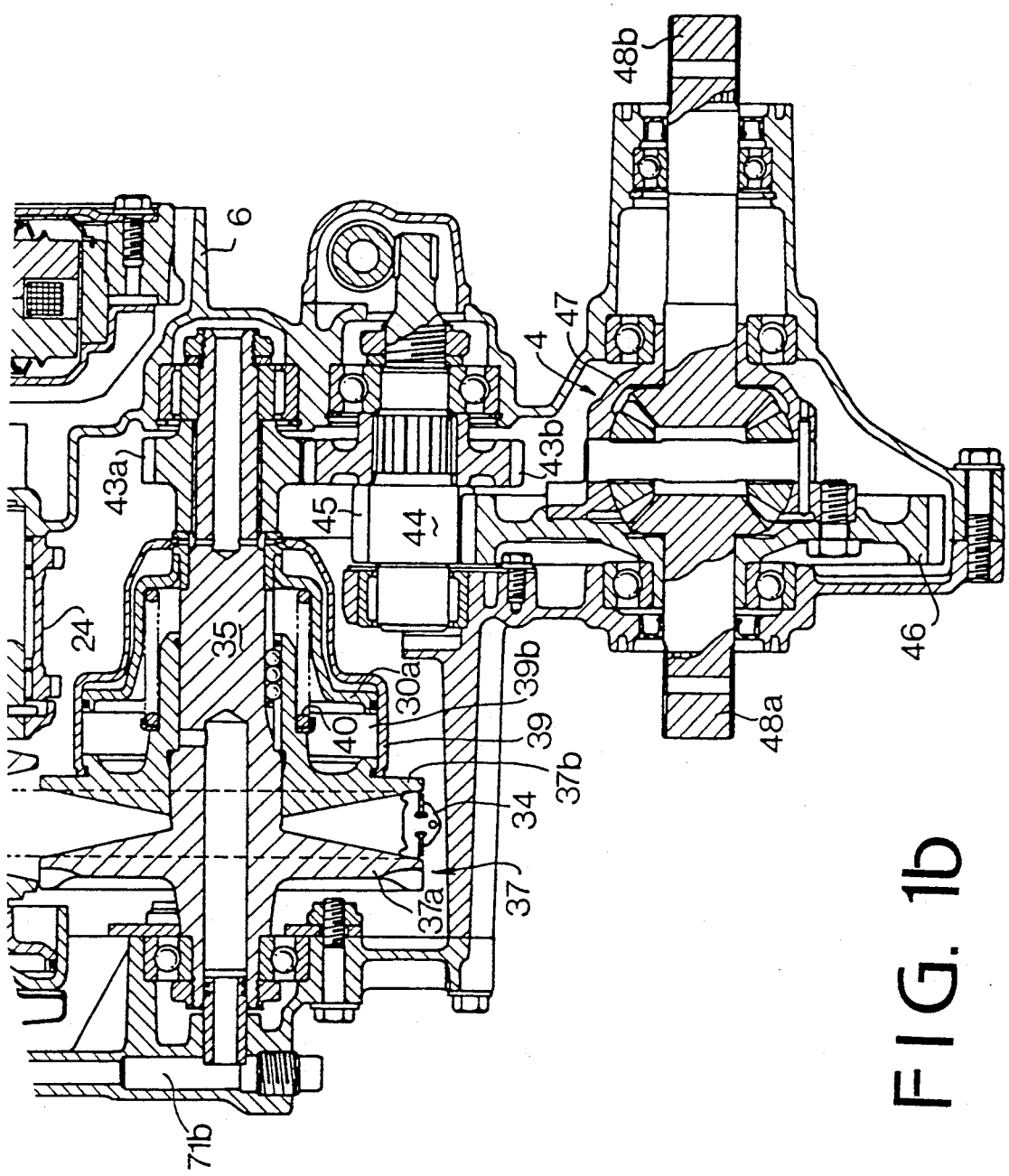

FIGS. 1a and 1b show a power transmission system with a continuously variable belt-drive automatic transmission for a motor vehicle, to which the present invention is applied. An engine E is transversely mounted on a motor vehicle at a front portion thereof. The power transmission system comprises an electromagnetic powder clutch 1, a selector device 2, a continuously variable belt-drive transmission 3, and a final reduction device 4 for front wheels. The electromagnetic powder clutch 1 is provided in a housing 6. The selector device 2, transmission 3 and final reduction device 4 are provided in a main housing 7 and a side housing 8. A crankshaft 10 of the engine E is connected to an annular drive member 12 through a drive plate 11 of the electromagnetic powder clutch 1. The electromagnetic powder clutch 1 comprises a driven member 14, a magnetizing coil 15 provided in the driven member 14. The driven member 14 has its outer periphery spaced from the inner periphery of the drive member 12 by a gap 16. Powder of magnetic material is provided in the gap 16. The driven member 14 is secured to an input shaft 13 of the belt-drive transmission 3. The coil 15 is supplied through brushes and slip rings with current from a control circuit for the electromagnetic powder clutch 1.

When the magnetizing coil 15 is excited by the clutch current, driven member 14 is magnetized to produce a magnetic flux passing through the drive member 12. The magnetic powder is aggregated in the gap 16 by the magnetic flux and the driven member 14 is engaged with the drive member 12 by the powder. On the other hand, when the clutch current is cut off, the drive and driven members 12 and 14 are disengaged from one another.

The selector device 2 is provided between the input shaft 13 and a main shaft 20. The main shaft 20 is cylindrical and is disposed coaxially with the input shaft 13. The selector device 2 comprises a drive gear 21 integral with the input shaft 13, a reverse driven gear 22 rotatably mounted on the main shaft 20, and a synchronizer 27 mounted on the main shaft 20. The drive gear 21 meshes with one of counter gears 24 rotatably mounted on a shaft 23. Another gear of the counter gears 24 engages with an idler gear 26 rotatably mounted on a shaft 25, which in turn engages with the driven gear 22.

The synchronizer 27 comprises a hub 28 secured to the main shaft 20, a synchronizer sleeve 29 slidably engaged with the hub 28 with splines, and synchronizer rings 30 and 31. The synchronizer sleeve 29 is adapted to engage with splines of the drive gear 21 or with splines of the driven gear 22 through rings 30 or 31.

At a neutral position (N range) or a parking position (P range) of a selector lever 136 (FIG. 2b), the sleeve 29 does not engage either gear, so that the main shaft 20 is disconnected from the input shaft 13. When the sleeve 29 is engaged with the gear 21, the input shaft 13 is connected to the main shaft 20 through the gear 21 and synchronizer 27 to provide a drive range position (D, Ds ranges). When the sleeve 29 is engaged with the gear 22, the input shaft 13 is connected to the main shaft 20 through gears 21, 24, 26 and 22 to provide a reverse drive range position (R range).

The main shaft 20 has an axial passage in which an oil pump driving shaft 42 connected to the crankshaft 10 is mounted. In the transmission 3, an output shaft 35 is provided in parallel with the main shaft 20. A drive pulley 36 and a driven pulley 37, of the transmission 3 are mounted on shafts 20 and 35. A fixed conical disc 36a of the drive pulley 36 is integral with main shaft 20 and an axially movable conical disc 36b is axially slidably mounted on the main shaft 20. The movable conical disc 36b also slides in a cylinder 38a secured to the main shaft 20 to form a servo device 38 having a chamber 38b.

A fixed conical disc 37a of the driven pulley 37 of the transmission 3 is formed on the output shaft 35 opposite the movable disc 36b and a movable conical disc 37b is slidably mounted on the output shaft 35 opposite disc 36a. The movable conical disc 37b also slides in a cylinder 39a secured to the output shaft 35 to form a servo device 39. A chamber 39b of the servo device 39 is communicated with an oil pump 41 through a passage 71b. A spring 40 is provided to urge the movable conical disc 37b to the fixed conical disc 37a. A drive belt 34 of the transmission 3 engages with the drive pulley 36 and the driven pulley 37. The movable disc 36b has an area exposed to the line pressure which is larger than the corresponding area of the movable disc 37b.

Secured to the output shaft 35 is a drive gear 43a which engages with an intermediate reduction gear 43b on an intermediate shaft 44. An intermediate gear 45 on the intermediate shaft 44 engages with a final gear 46. Rotation of the final gear 46 is transmitted to axles 48a and 48b of front driving wheels (not shown) of the vehical through a differential 47.

Figure 2A:
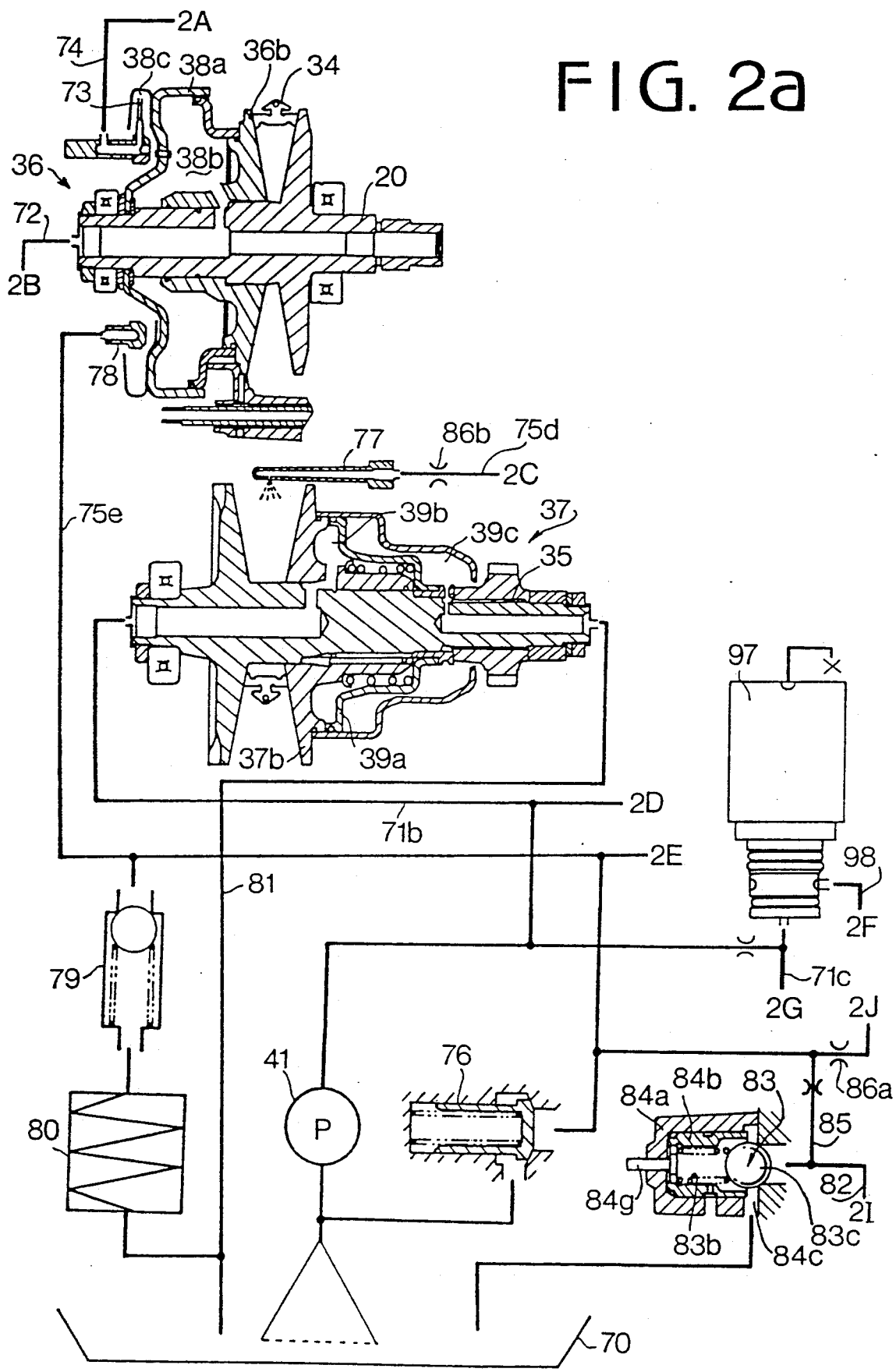
FIGS. 2a and 2b show a hydraulic control circuit according to the present invention.
Figure 2B:
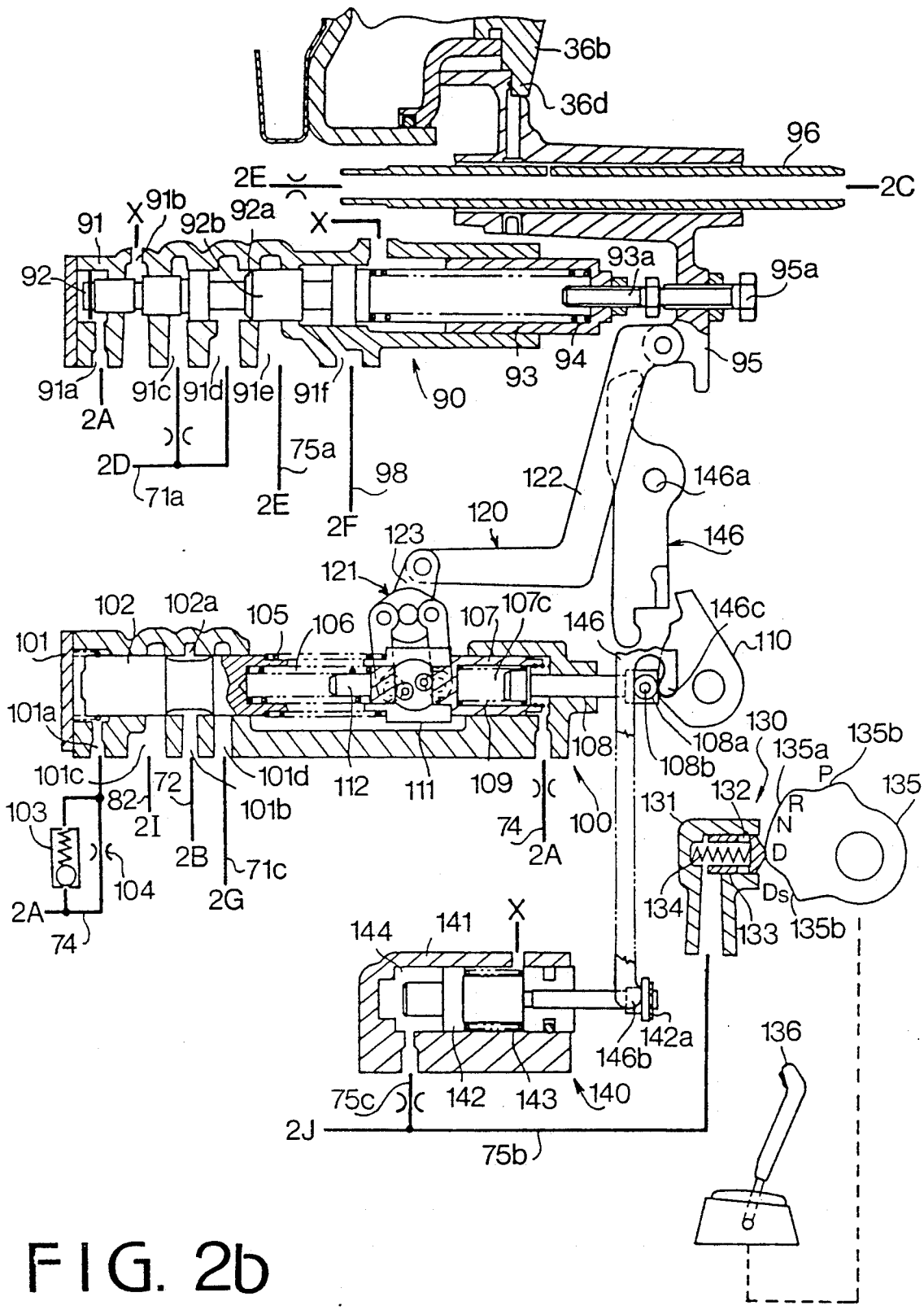

FIGS. 2a and 2b show a hydraulic control circuit according to the present invention. The circuit is provided with a pressure regulator valve 90 and a transmission ratio control valve 100.

The pressure regulator valve 90 comprises a valve body 91, spool 92, and spring 94 provided between a spring retainer 93 and one end of the spool 92 for urging the spool to the left.

The transmission ratio control valve 100 comprises a valve body 101, a spool 102, an operating plunger 107, and a modulator 120 for controlling the pressure applied to the spool 102. Oil in an oil reservoir 70 is supplied to a port 91c of the pressure regulator valve 90 through a passage 71a by the pump 41. An oil passage 71b connected to the passage 71a is communicated with the driven pulley servo chamber 39b. An oil passage 71c is further communicated with the drive pulley servo chamber 38b through ports 101d and 101b of the transmission ratio control valve 100 and a passage 72. Oil flows back from a port 91e of the regulator valve 90 to the inlet of the pump 41 through drain passages 75a and a relief valve 76. A drain port 101c of the transmission ratio control valve 100 is communicated with the oil reservoir 70 through a drain passage 82 and a check valve 83 having a shift lock mechanism.

The drive pulley cylinder 38a has an annular inside groove 38c in which a rotation speed sensor 73 in the form of a pitot tube is provided for measuring the speed of the oil in the groove 38c, that is the speed of the main shaft 20 which is proportional to the engine speed. The pitot pressure produced by the rotation speed sensor 73 is applied to an end chamber 91a of the valve 90 through passages 74. The pitot pressure is further applied to an end chamber 101a of the valve 100 through a check valve 103 or an orifice 104.

The port 91e of the pressure regulator valve 90 is communicated with a select position detecting valve 130 upstream of the relief valve 76 through a passage 75a and a passage 75b having an orifice 86a and further with an actuator 140 for the transmission ratio control valve 100 through a passage 75c. The passage 75a is communicated with the drain passage through a passage 85.

A sensor shoe 95 for detecting the actual transmission ratio is slidably mounted on a lubricating oil pipe 96 which is parallel with the axis of the spool 92. A bolt 95a secured to an end of the sensor shoe 95 engages with an end of a bolt 93a secured to the spring retainer 93, and the other end of the sensor shoe 95 engages with an outside periphery 36d of the movable disc 36b. Thus, the position of the movable disc 36b which means the transmission ratio during the operation is transmitted to the spool 92 through the spring 94. At the end of the valve body 91, opposite to the spring 94, pitot pressure is applied to the end chamber 91a, and the line pressure in the passage 71a is applied to port 91c. A port 91b which is provided between the chamber 91a and the port 91c for preventing the leakage of the oil dependent on the line pressure, is communicated with the oil reservoir 70 through drain passages. A port 91d is communicated with the port 91e through a chamfer 92a formed on a land 92b of the spool 92 when the spool 92 is shifted to the right, so that the line pressure can be regulated. A line pressure level changing port 91f provided adjacent the port 91e is communicated with the passage 71c through a passage 98 and a solenoid operated changeover valve 97. The solenoid operated valve 97 is a three-way valve provided to selectively communicate the passage 71c with the port 91f when a solenoid is energized, or with a drain port when the solenoid is de-energized.

Thus, the spool 92 is applied with the pitot pressure and line pressure so as to be moved in the direction to open the port 91e, whereas the elastic force of the spring 94 corresponding to the transmission ratio detected by the sensor shoe 95 urges the spool 92 in the direction to close the port 91e.

Designating the difference between pressure receiving areas of the spool 92 at the port 91c as $A_L$ and the difference between pressure receiving areas at the port 91f as $A_C$, the relationship between the line pressure $P_L$ and the spring force F exerted by the spring 94 when the solenoid operated valve 97 is not energized to drain the oil at the port 91f is expressed as follows.

$$A_L \times P_L = F$$

Thus, the line pressure $P_L$ is controlled in accordance with the equation of $P_L = F/A_L$ to a higher value. When the solenoid of the solenoid operated valve 97 is energized to apply the oil to the port 91f, the relationship is expressed as $$(A_L + A_C) \times P_L = F$$

Thus, the line pressure $P_L$ is controlled to a lower value in accordance with $P_L = F/(A_L + A_C)$. The sensor shoe 95 is moved to the right in FIG. 2b as the transmission ratio decreases, reducing the force of the spring 94 to lower the line pressure. The line pressure is exerted on the belt 34 at a proper force dependent on the transmission ratio so as not to cause the belt to slip on the pulleys.

A nozzle 77 provided adjacent an inner periphery of the belt 34 is supplied with oil through a passage 75d having an orifice 86b to eject the oil to the belt 34 to lubricate it. The passage 75d is communicated with the passage 75a through the lubricating oil pipe 96. The passage 75a is communicated with a passage 75e and with the oil reservoir 70 through a check valve 79 and an oil cooler 80, and further communicated with a nozzle 78 provided in the groove 38c of the drive pulley cylinder 38a to supply the oil into the groove 38c. The driven pulley 37 has a balancer chamber 39c formed adjacent the oil chamber 39b opposite to the disc 37b, which is supplied with oil through a passage 81 communicated downstream of the oil cooler 80, thereby counterbalancing centrifugal oil pressure in the oil chamber 39b.

The transmission ratio control valve 100 has an annular groove 102a formed on the spool 102 so as to communicate the port 101b with the port 101c or port 101d for supplying or discharging oil to or from the drive pulley servo chamber 38b in dependency on the position of the spool 102. The plunger 107 is slidably mounted in the valve body 101 and has an axial cavity 107c. A rod 108 is axially slidably mounted in the valve body 101, and a flange 108d of the rod 108 is slidably engaged with the wall of the cavity 107c. A spring 109 is provided between the flange 108d and the plunger 107. Both end chambers of the transmission ratio control valve 100 are supplied with the pitot pressure. A roller 108a provided at an end of the rod 108 engages with a cam 110 which is operatively connected to an accelerator pedal (not shown) of the vehicle so as to be rotated in dependency on the depression of the pedal.

The modulator 120 has a pressure controller 121 provided between the plunger 107 and the spool 102 of the transmission ratio control valve and a link assembly 122 connected to the sensor shoe 95 at one end and to the controller 121 at the other end. The controller 121 has a guide member 111 and a plunger 112 provided in the guide member. A spring 105 is disposed between the spool 102 and the guide member 111, and a spring 106 is provided between the spool 102 and the plunger 112.

Referring to FIG. 2b, a select position detecting valve 130 comprises a valve body 131, a valve 133 having a drain aperture 132 which is slidably mounted in the valve body 131, and a spring 134 for urging the valve 132 to a cam 135 which rotates according to the position of the selector lever 136. The cam 135 has a lobe 135a corresponding to D, N, R range positions, and lobes 135b formed in the both sides of the lobe 135a, corresponding to P and Ds range positions. At the D, N, R range positions, the lobe 135a pushes the valve 133 in the direction to close the drain aperture 132, so that actuating oil pressure is built up. At the P and Ds range positions, the valve 133 moves outwards to open the drain aperture 132 to drain the oil therefrom, so that the oil pressure in the passages 75b and 75c is reduced. At that time the oil pressure in the oil passage 75b decreases gradually, because of an orifice 86a provided in the oil passage 75b. The oil pressure is applied to an actuator 140.

The actuator 140 comprises a cylinder 141, a piston 142 which is slidably mounted in the cylinder 141, and a spring 143 for urging the piston 142 to a piston chamber 144 to which actuating oil pressure is applied through a passage 75c. A correction lever 146 rotatably supported by a pin 146a is provided between the sensor shoe 95 and the actuator 140. The lever 146 has a finger 146b which is engageable with a hook 142a of an outer end of a rod of the piston 142, and a lobe 146c which is engageable with a pin 108b on the rod 108 of the transmission ratio control valve 100. At the P range or Ds range, since no actuating oil pressure exists in the piston chamber 144, piston 142 presses the finger 146b to rotate the lever 146 about the pin 146a. Consequently the lobe 146c engages the pin 108b to push the rod 108 a predetermined stroke to the left in FIG. 2b, thereby changing the transmission zone to the side of high engine speed. Thus, the releasing of the accelerator pedal at Ds range causes downshifting of the transmission, so that engine braking effects. Under such a condition, when the transmission is downshifted to shift the disk 36b to the left, the sensor shoe 95 engages with the end of lever 146 to rotate it. Thus, the rod 108 and piston 142 are moved toward the right as the transmission ratio increases, and, at the maximum transmission ratio, the piston 142 is returned to the right end position.

Figure 3:
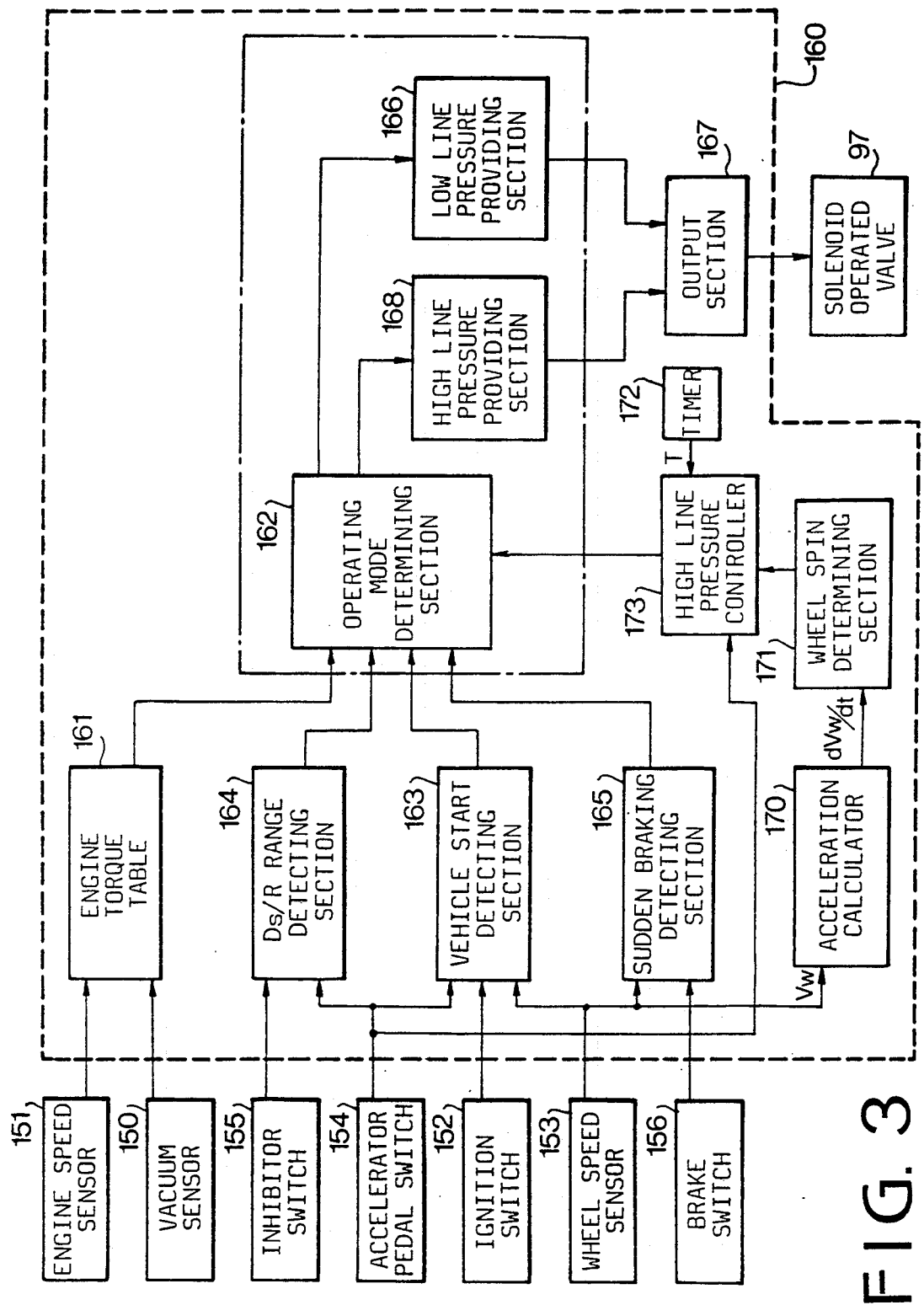
FIG. 3 is a block diagram of a control unit for controlling the line pressure.

Referring to FIG. 3, a control unit 160 is provided for controlling the solenoid operated valve 97. The control unit 160 is applied with signals from a pressure sensor 150 for detecting pressure in an intake passage, an engine speed sensor 151, ignition switch 152, wheel speed sensor 153, accelerator pedal switch 154, inhibitor switch 155 and brake switch 156. The control unit 160 has an engine torque look-up table 161 from which an engine torque is derived in accordance with the output signals of the pressure sensor 150 and engine speed sensor 151. Signals from the ignition switch 152, the accelerator pedal switch 154 and the wheel speed sensor 153 are applied to a vehicle start detecting section 163 for detecting driving of the vehicle below a predetermined vehicle speed. The output of the wheel speed sensor 153 represents the vehicle speed.

A Ds/R range detecting section 164 is fed with the output signals of the accelerator pedal switch 154 and inhibitor switch 155 so as to determine the Ds and R ranges, respectively. The control unit 160 further has a sudden brake detecting section 165 to which vehicle speed Vw and an output signal of the brake switch 156 are fed to detect sudden braking which causes a deceleration larger than a predetermined value.

Output signals of the table 161 and detecting sections 163 to 165 are applied to an operating mode determining section 162. When the engine is in a steady state, namely, when the engine torque is smaller than a predetermined reference torque, vehicle speed exceeds a predetermined speed, the vehicle is in the D-range and when the brake pedal is not suddenly depressed, the determining section 162 applies a signal to a low line pressure providing section 166. The providing section 166 in turn feeds a signal to the solenoid operated valve 97 through an output section 167. Thus, the solenoid of the valve 97 is energized so that the line pressure $P_L$ is controlled to a low level line pressure $P_{Ll}$.

On the other hand, if the engine is in a transient state, that is, the operating conditions of the engine are such that the engine torque is larger than the reference value, the vehicle speed is not yet higher than the reference speed after the starting of the engine, the vehicle is in Ds or R range, or that the vehicle is suddenly braked, the operating mode determining section 162 feeds a signal to a high line pressure providing section 168. Accordingly, the solenoid operated valve 97 is rendered inoperative, thereby draining the oil. Thus, the line pressure $P_L$ becomes higher to a high level line pressure $P_{Lh}$.

The control unit 160 is further provided with an acceleration calculator 170 where an acceleration dVw/dt is calculated based on the wheel speed Vw. The acceleration dVw/dt is applied to a wheel spin determining section 171 where the acceleration dVw/dt is compared with a predetermined reference acceleration G at which the spinning of wheels does not occur on a dry road. When the acceleration dVw/dt is larger than G (dVw/dt≧G), it is determined that the wheels are spinning. Output signals of the wheel spin determining section 171, the accelerator pedal switch 154 and a timer 172 are applied to a high line pressure controller 173 which feeds a signal to the operating mode determining section 162. The signal from the controller 173 continues for a time T counted by the timer 172 after the release of the accelerator pedal.

The operation of the system is described hereinafter. While the vehicle is at a stop, the driven pulley servo chamber 39b is supplied with the line pressure adjusted by the pressure regulator valve 90 through the passages 71a, 71b, and the drive pulley servo chamber 38b is drained, since the spool 102 is at the left end position by the springs. Thus, the driving belt 34 engages with the driven pulley 37 at a maximum running diameter to provide the largest transmission ratio iL (low speed stage). On the other hand, the selector lever 136 is at the N range position to select the N range, so that the drain aperture 132 of the select position detecting valve 130 is closed. When the D range is selected, the input shaft 13 and the main shaft 20 are connected to each other in the selector device 2 by the selector lever 136.

At that time, since the accelerator pedal is released, the cam 110 is substantially at a vertical position. Accordingly, the rod 108 projects out of the valve body 101 so that minimum load is exerted on the spring 105.

When the accelerator pedal is depressed, the electromagnetic powder clutch 1 is excited by a clutch current, transmitting the engine power to the drive pulley 36. The power of the engine is transmitted to the output shaft 35 at the largest transmission ratio by the driving belt 34 and driven pulley 37, and further transmitted to axles of the driving wheels. Thus, the vehicle is started.

When the depression of accelerator pedal exceeds a predetermined degree, the cam 110 is rotated, thereby pressing the rod 108 to the left. Thus, a larger load is exerted on the spring 105 of the transmission ratio control valve 100.

At the largest transmission ratio, the sensor shoe 95 is positioned at the left end position. Thus, the pressure controller 121 is so positioned as to retract the plunger 112 in the guide member 111, disengaging from the spring 106. Therefore, the spool 102 is urged by a small force of the spring 105 only so that it is balanced by a relatively small pitot pressure applied to the chamber 101a. Consequently, the transmission starts to upshift at a low engine speed.

As the transmission is upshifted, the sensor shoe 95 shifts to the right, whereby rotating the pressure controller 121 in the counterclockwise direction in FIG. 2b. Consequently, the plunger 112 is moved to the left. Until the plunger 112 attaches the spring 106, the transmission ratio changes, keeping the engine speed constant. After the plunger 112 engaged the spring 106, the spool 102 is urged to the left by the springs 105 and 106. Accordingly, the transmission is upshifted with increase of the engine speed.

When the accelerator pedal is released, the shift cam 110 returns to the initial vertical position so that the load on the springs 105 and 106 is quickly reduced. Accordingly, the spool 102 is shifted to the right to communicate the port 101b with the port 101d, thereby applying oil to the chamber 38b of the drive pulley 36 via the lines 71c and 72 to upshift the transmission ratio of the transmission. Thus, the transmission ratio starts to upshift to the smallest transmission ratio iH.

The operation for controlling the line pressure will be described hereinafter.

Figure 4:
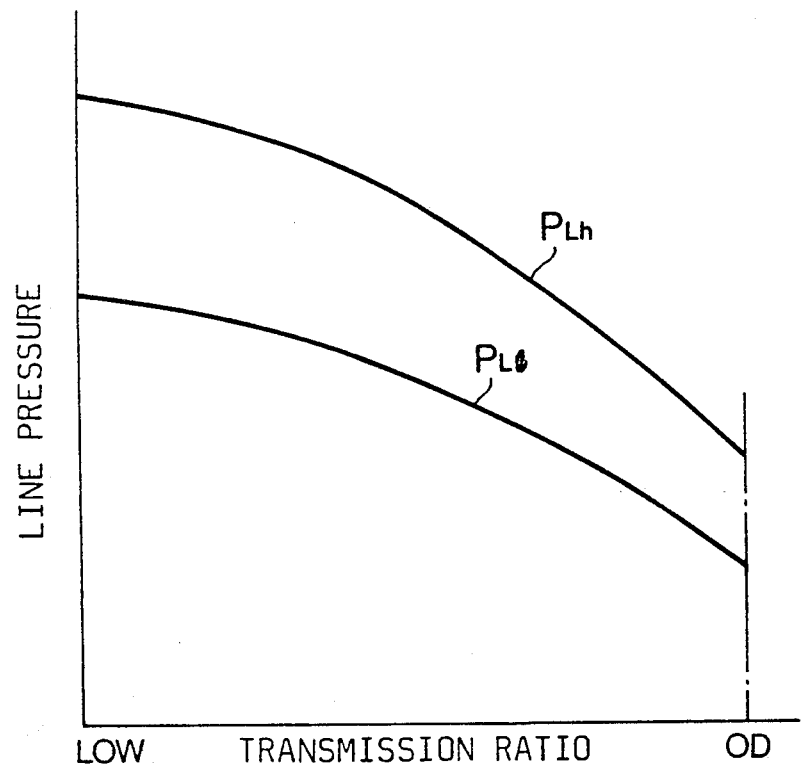
FIG. 4 shows a relationship between the transmission ratio and the line pressure.

When the vehicle is driven in the D range at a steady state, the operating mode determining section 162 applies a low line pressure signal to the low line pressure providing section 166. Accordingly, the solenoid of the solenoid operated valve 97 is energized to communicate the passage 71c with the passage 98 so that oil is supplied to the port 91f of the pressure regulator valve 90. Consequently, the elastic force of the spring 94 is reduced so that the line pressure $P_{Ll}$, which is regulated in dependency on the transmission ratio, becomes low (FIG. 4). When the transmission ratio is large in the low engine speed stage, since the spring force exerted by the spring 94 on the spool 92 is large, the port 91e is closed by the land 92a of the spool 92 to reduce the amount of drain. As a result, the line pressure is increased. As the transmission is upshifted shifting the sensor shoe 95 to the right, the spring force reduces, thereby draining the oil through the port 91e to decrease the line pressure $P_{Ll}$ as shown in FIG. 4.

When the vehicle is driven in a heavy load range at an engine torque larger than the predetermined torque, or in a high engine speed range of the Ds range, or when the vehicle is suddenly braked, the operating mode determining section 162 feeds a high line pressure signal to the high line pressure providing section 168. Thus, the solenoid of the solenoid operated valve 97 is de-energized, thereby communicating the passage 98 with the drain port of the valve 97. As a result, the spool 92 of the pressure regulator valve 90 is shifted to the left, to provide the high level line pressure $P_{Lh}$ as shown in FIG. 4. The ratio between the line pressures $P_{Ll}$ and $P_{Lh}$ is constant at any transmission ratio.

Thus, if the vehicle is in a steady driving state in light and middle engine load ranges, the low line pressure $P_{Ll}$ corresponding to the engine torque is applied to the pulleys. On the other hand, in a high engine torque range or in a Ds range, a high level line pressure is applied so that slipping of the belt on the pulleys at rapid braking is prevented. In addition, since the relative positions of the pulleys 36 and 37 and the belt 34 may not be always appropriate at the start of the engine, the high level line $P_{Lh}$ pressure is temporarily supplied so as to adjust the positions of the pulleys and to tense the belt.

Figure 5:
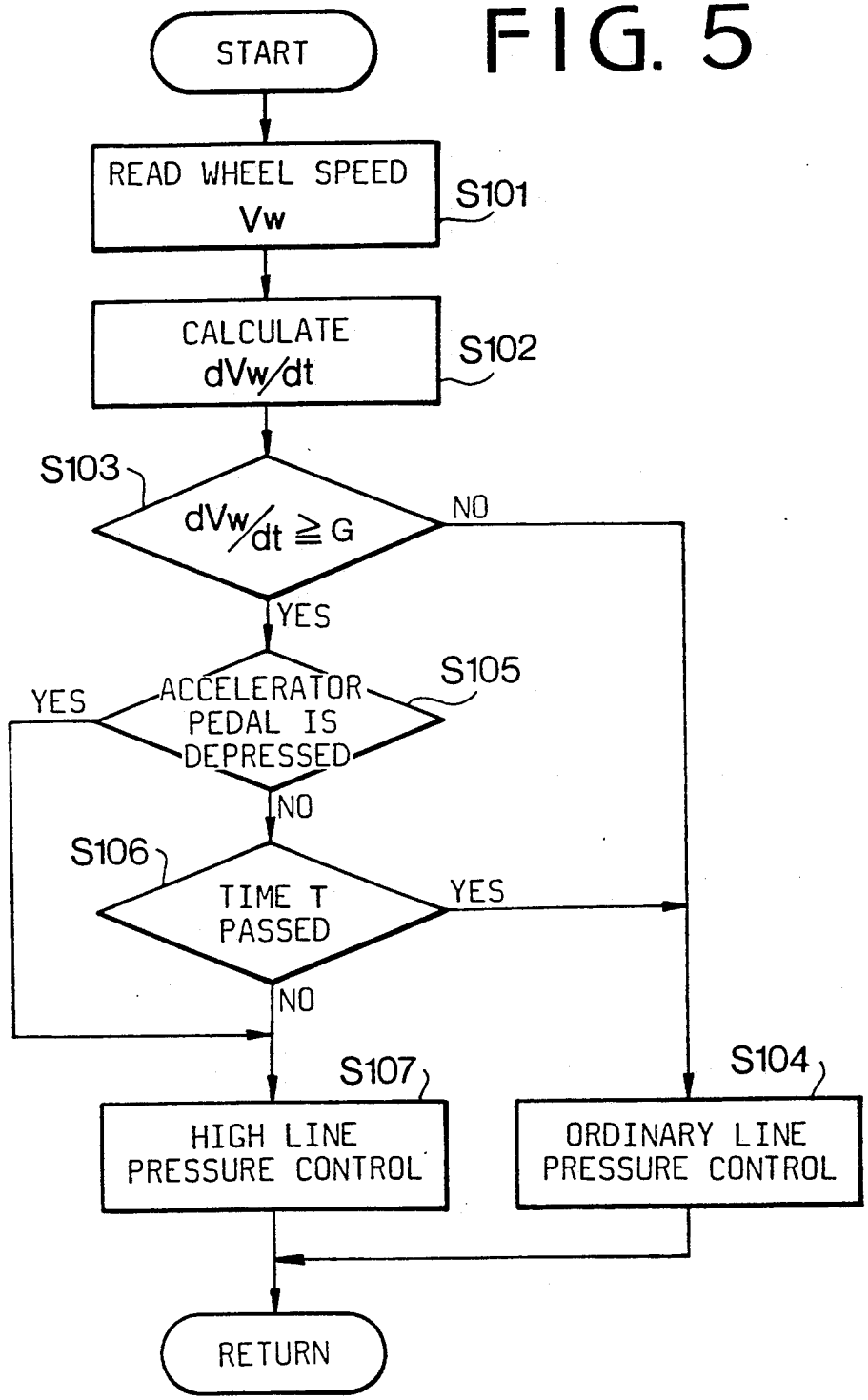
FIG. 5 is a flowchart showing the operation of the system of the present invention.

The control operation during the spinning of the wheels is described with reference to the flowchart shown in FIG. 5.

The wheel speed Vw is detected at regular intervals and the acceleration dVw/dt is calculated at steps S101 and S102. When it is determined at a step S103 that the acceleration dVw/dt is smaller than the reference value G, the program goes to a step S104 to perform the above described operation for the ordinary line pressure control.

Figure 6A:
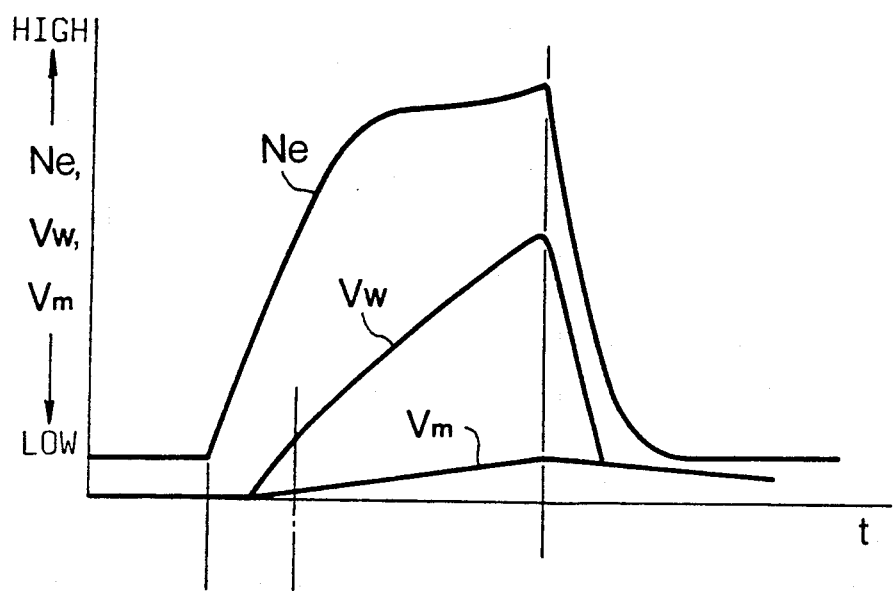
FIGS. 6a to 6c are graphs showing characteristics of vehicle speed, wheel speed, and engine speed, transmission ratio and line pressure, and throttle valve opening degree, respectively.
Figure 6B:
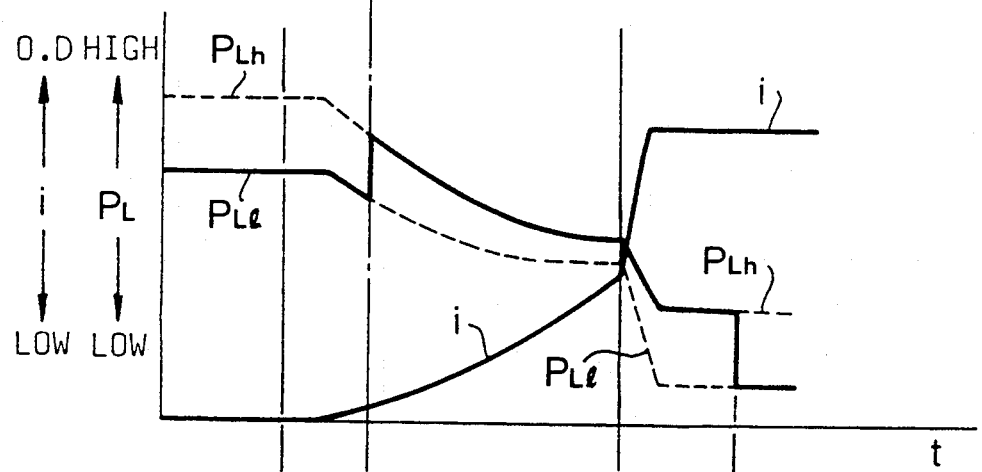
Figure 6C:
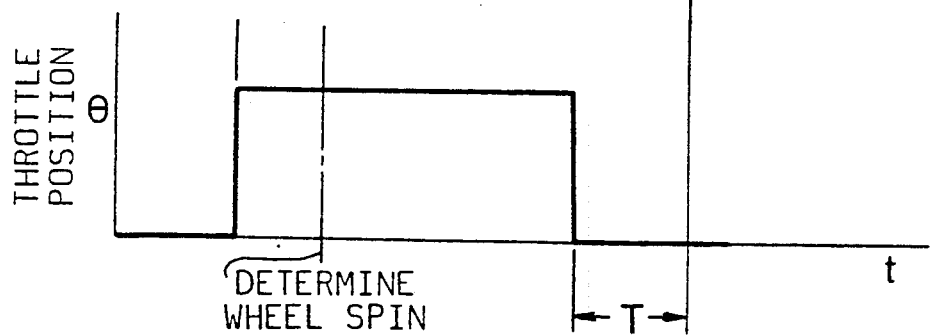

When the acceleration dVw/dt exceeds the value G while accelerating on a road having a low friction coefficient, it is determined that at least one of the wheels is spinning. At a step S105, it is determined whether the accelerator pedal is depressed dependent on the output signal of the accelerator pedal switch 154. When the accelerator pedal is depressed, the program proceeds to a step S107 to de-energize the solenoid of the solenoid operated valve 97. Accordingly, the line pressure is controlled at a high level as shown in FIG. 6b. When the driver becomes aware of the slipping and releases the accelerator pedal, the program goes to a step S106 to determine whether the time T passed. Thus, the high level line pressure $P_{Lh}$ is applied for the time T after the release of the accelerator pedal. The transmission is upshifted so that the high level line pressure $P_{Lh}$ is decreased as shown by the full line in FIG. 6b. Although, the line pressure applied to the cylinder 39a of the driven pulley 37 decreases, the pressure is held at a comparatively high level. Therefore, the belt 34 is firmly gripped by the drive and driven pulleys 36, 37. Consequently, although the rotational speed of the pulleys rapidly decreases when the accelerator pedal is released, the belt is rotated without slipping.

When the accelerator pedal is released after the predetermined time T, the program goes to the step S104 to provide the low level line pressure $P_{Ll}$.

If a failure occurs in an electric system, the solenoid of the valve 97 is de-energized to provide the high level line pressure. Thus, failsafe operation for preventing the slipping of the pulleys is performed.

In accordance with the present invention, when the wheels of the vehicle spin, the line pressure is kept at a high level even after the release of the accelerator pedal so that the slipping of the pulleys caused by a sudden change in rotational speed is prevented. In addition, the line pressure is easily controlled by employing the solenoid operated valve.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A line pressure control system for a continuously variable transmission for transmitting the power of an automotive engine to wheels of a motor vehicle having an accelerator pedal, the system having a drive pulley with a hydraulically shiftable disc and a hydraulic cylinder for operating the disc, a driven pulley having a hydraulically shiftable disc and a hydraulic cylinder for operating the disc, a belt engaged with both pulleys and a hydraulic circuit having a pressure regulator valve for regulating the line pressure in the circuit, the system comprising:
a wheel speed sensing means for sensing speed of wheels;
an accelerator pedal switching means for detecting the depression of the accelerator pedal;
wheel spin detector means responsive to signals of the wheel speed sensing means and the accelerator pedal switching means for producing a wheel spin signal when the acceleration of the wheel speed is higher than a predetermined value;
means responsive to the wheel spin signal for producing a changing signal to change the line pressure;
line pressure level changing device provided in the hydraulic circuit for changing the line pressure from low level to high level in response to the changing signal.

2. The system according to claim 1, further comprising timer means responsive to a signal from the accelerator pedal switch at the release of the accelerator pedal for producing a timer signal for a predetermined time, said means further responsive to the timer signal for continuing to produce the changing signal to the line pressure level changing device.

3. The system according to claim 1, wherein:
the line pressure level changing device comprises
a pressure level changing port provided on the pressure regulator valve for changing the line pressure between the high and low level in dependency on an oil pressure threat;
a solenoid operated valve provided for supplying the line pressure to the pressure level changing port in a first state and for draining the oil at the port in a second state, so as to change the line pressure in dependency on the first and second state.

* * * * *